March 20, 1956     G. J. SHARPS     2,738,562
FISH HOLDER
Filed April 5, 1954
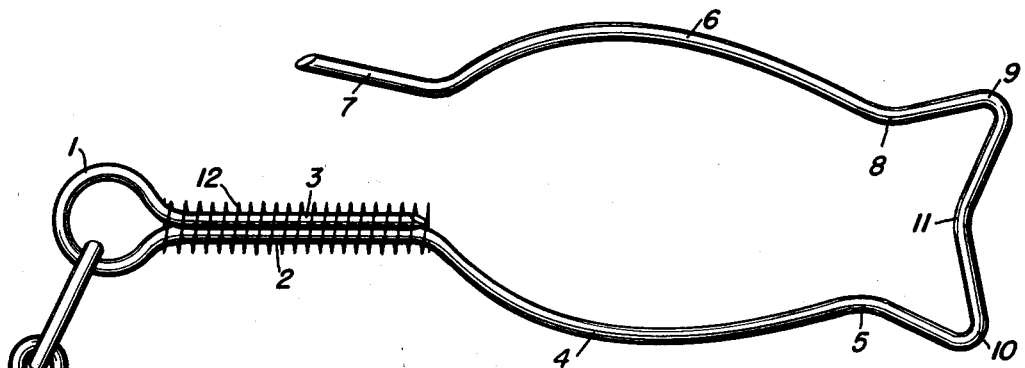
FIG. 1.
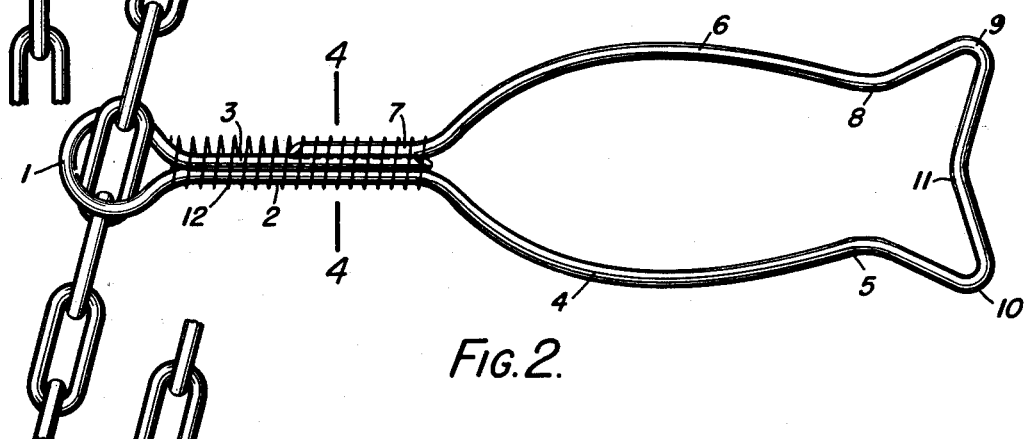
FIG. 2.
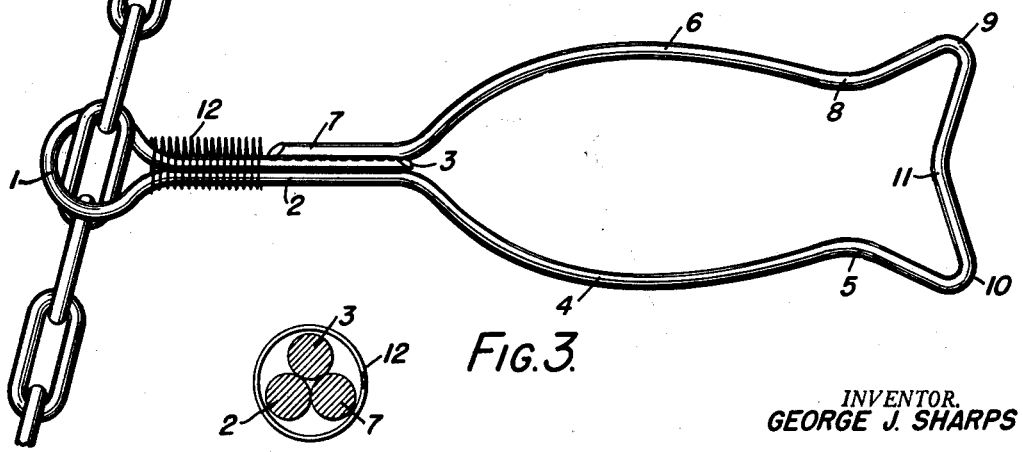
FIG. 3.
FIG. 4.
INVENTOR.
GEORGE J. SHARPS
BY Harold E. Stonebraker,
HIS ATTORNEY

United States Patent Office 2,738,562
Patented Mar. 20, 1956

2,738,562
FISH HOLDER

George J. Sharps, Momence, Ill., assignor to P & K Incorporated, Momence, Ill., a corporation of Illinois Application April 5, 1954, Serial No. 421,043

3 Claims. (Cl. 24—236)

This invention relates to a fish holder of the type that is attachable to a stringer chain or line, and has for its purpose to afford a construction that can be readily opened to attach a fish and which when closed holds the fish securely and prevents accidental opening of the holder.

In structures of the class mentioned, a chief objection has been that a large fish by applying sufficient pressure within the loop portion of the holder can remove or slide the bill out of the retaining part of the holder and release the fish, and it is a particular object of the invention to afford a structure that obviates such unintended operation and in which the usual high pressures exerted by a large fish secured on the holder will not release the bill and open the holder.

A further purpose of the invention is to afford a fish holder formed of a single length of resilient wire bent to the required shape and in which the fish-engaging loop portion possesses maximum strength and rigidity, serving effectively to retain the bill in closed position and prevent its removal from the retaining means.

Still another object of the invention is to afford a device that, in addition to being more efficient than prior holders for the purpose, is simpler, stronger, more economical to manufacture, and easier to operate.

To these and other ends, the invention consists in the construction and arrangement of parts that will appear more clearly from the following description when read in conjunction with the accompanying drawings, the novel features being pointed out in the claims following the specification.

In the drawings:

Fig. 1 is a view in side elevation of a fish holder constructed in accordance with a preferred embodiment of the invention, showing it attached to a stringer chain and with the bill of the holder in open position;

Fig. 2 is a view similar to Fig. 1 showing the bill in closed position after release of the retaining spring;

Fig. 3 is a similar view showing the retaining spring in the compressed position in which it is held to permit the bill to be moved inwardly to its closed position indicated in Fig. 2, where it is held by the retaining spring when the latter is released, and Fig. 4 is a transverse sectional view on line 4—4 of Fig. 3.

Referring more particularly to the drawings in which like reference numerals refer to the same parts throughout the several views, the holder is formed of an integral single length of heavy resilient wire bent upon itself at one end to form an eye 1 to receive a stringer chain or line on which the holder is threaded as usual, the eye 1 terminating at one side in a straight elongated connecting portion 2 and at its other side in a straight elongated terminal portion 3 arranged parallel to and in juxtarelation to the connecting portion 2. The connecting portion 2 and terminal portion 3 are slightly offset relatively from the plane of eye 1 and are of approximately the same length, the terminal portion preferably extending slightly beyond the free end of the connecting portion 2.

The elongated connecting portion 2 merges into a loop portion on which the fish is retained when the holder is closed, the loop portion including a side 4 which curves gradually outwardly from the connecting portion 2 and has an inwardly projecting indentation 5 adjacent to its outer extremity. The side 6 is curved outwardly similarly to side 4 and terminates in a bill 7 that is inserted through the jaws of a fish when positioning the latter on the holder, and the side 6 has an indentation 8 adjacent to its outer extremity, similar to indentation 5. The sides 4 and 6 are spaced apart at their outer extremities while 9 and 10 designate rounded corner portions connecting the sides with the end portion which has a centrally arranged inwardly projecting indentation 11 that serves to stiffen the loop portion and prevent accidental removal of the bill from its retaining means.

12 desginates the retaining means preferably in the form of a compressible coiled wire spring surrounding the elongated connecting and terminal portions 2 and 3 and located adjacent to the eye 1. When a fish is secured within the loop portion by inserting the bill 7 through the jaws, the spring 12 is compressed against the eye 1 to permit the bill 7 and side 6 to be moved inwardly until bill 7 is parallel and adjacent to the connecting portion 2 and terminal portion 3. The bill 7 when in such position extends approximately half the length of the terminal and connecting portions and is located between and in contiguous relation thereto, whereupon the spring 12 is released and assumes a position surrounding bill 7 and extending throughout the length of the connecting and terminal portions 2 and 3, its further movement being limited by the sides 4 and 6. The connecting and terminal portions 2 and 3 thus serve as guides and locating means for the bill and spring as the latter assumes a locking or retaining relationship to the bill 7.

The indentation 11 at the outer end of the loop portion imparts strength and rigidity to the loop portion of the holder and in conjunction with indentations 5 and 8 prevents removal of bill 7 from the spring, that might otherwise occur as a result of an endwise pull on the outer end of the loop portion. The indentation 11 prevents such distortion of the loop portion as would occur when a circular or continuously curved loop portion, which is impossible with a loop portion having reversely curved sides and an indentation as in the present invention.

Release of the bill of a fish holder is usually due to pressure exerted by the fish outwardly from inside a loop portion against opposite points thereof, and where such pressure is exerted against the outer and inner ends of the loop portion, such pressure exerted toward the inner ends of sides 4 and 6, where they meet when the holder is closed, has a tendency to press bill 7 and connecting portion 2 outwardly or apart from one another into tighter engagement with the retaining spring 12. This action is supplemented by the indentations 5 and 8 of the sides 4 and 6, which stiffen the sides and accentuate the tightened relationship between the bill 7, connecting portion 2, and the surrounding retaining spring 12. In this manner, the side 6 and bill 7 are held effectually against movement endwise of the spring 12, and are not releasable except by compressing spring 12.

This holding action of spring 12, resulting from the shape of the loop portion imparting rigidity and stiffness thereto, has resulted in such effectual holding of the bill that more than 150 pounds pressure must be exerted between the opposite ends of the loop portion before the bill will move substantially endwise of the spring. This compares with prior types of stringer holders heretofore available with circular and other forms of loop portions which on actual test were opened upon an application of pressures as low as 50 pounds and not to exceed 65 pounds applied at opposite sides between the ends of the loop portion, and oppositely directed pressures between the sides of the loop portion require even greater pressures so that likelihood of releasing the bill in such manner is comparatively negligible.

While the invention has been described in connection with a particular embodiment, it is not restricted to the exact details herein disclosed, and this application is intended to cover such departures or modifications as come within the purposes of the improvement or the scope of the following claims.

I claim:

1. A fish holder comprising a single length of resilient wire bent upon itself and including a stringer attaching eye at one end, straight elongated connecting and terminal portions extending from said eye and arranged in parallel contacting relation, an elongated loop portion comprising reversely curved sides, one of which curves outwardly from said connecting portion and thence inwardly and the other of which terminates at its free end in a straight bill which occupies a position alongside and in contact with said connecting and terminal portions, said sides being spaced at their outer extremities, an end portion connected with the outer extremities of said sides by means of acute-angle corner portions and having a centrally disposed inwardly projecting indentation, and a compressible retaining coil spring surrounding said bill and said connecting and terminal portions in close engagement therewith and extending from said eye to said loop portion.

2. A fish holder comprising a single length of resilient wire bent upon itself and including a stringer attaching eye at one end, straight elongated connecting and terminal portions extending from said eye arranged in parallel contacting relation, and an elongated symmetrical loop portion comprising a side which curves gradually outward from said connecting portion, a second outwardly curved side terminating in a straight bill at its free end which occupies a position alongside and in contact with said connecting and terminal portions, the outer extremities of said sides being laterally spaced, an end portion connected with the extremities of said sides by sharply rounded corners and having an inwardly projecting indentation intermediate said corners, and a compressible retaining coil spring surrounding said bill and said connecting and terminal portions in close engagement therewith and extending from said eye to said loop portion.

3. A fish holder comprising a single length of resilient wire bent upon itself and including a stringer attaching eye at one end, straight elongated connecting and terminal portions of approximately equal length extending from said eye and arranged in parallel contacting relation, and an elongated loop portion comprising a side which curves gradually outward from said connecting portion and has an inwardly projecting indentation adjacent to its outer extremity, a second outwardly curved and similarly indented side terminating in a straight bill at its free end which has a length approximately half the length of said connecting and terminal portions and occupies a position alongside and in contact with said connecting and terminal portions, the outer extremities of said sides being laterally spaced, an end portion connected with the outer extremities of said sides by sharply rounded corners and having an inwardly projecting indentation intermediate said corners, and a compressible retaining coil spring surrounding said bill and said connecting and terminal portions in close engagement therewith and extending from said eye to said loop portion.

References Cited in the file of this patent
UNITED STATES PATENTS

| Number | Name | Date |
|---|---|---|
| 312,105 | Faivre | Feb. 10, 1885 |
| 724,362 | Wilson | Mar. 31, 1903 |
| 2,662,257 | Milan | Dec. 15, 1953 |